Dec. 24, 1935.    G. W. CAMPBELL    2,025,643
NUT LOCK
Filed March 19, 1935
Fig. 1.
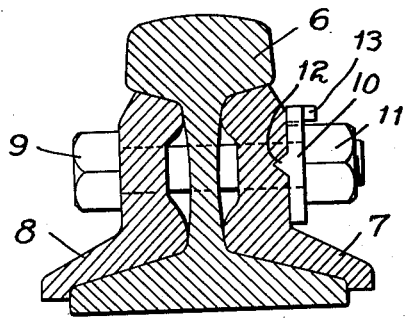
Fig. 2.
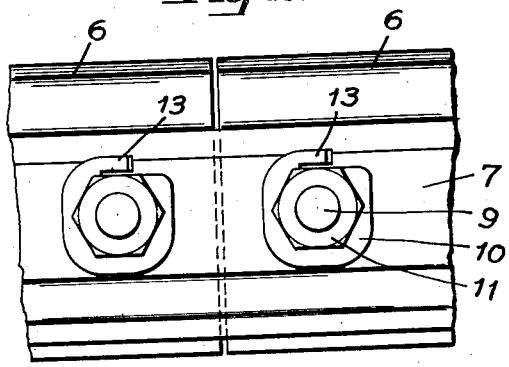
Fig. 3.    Fig. 4.    Fig. 5.
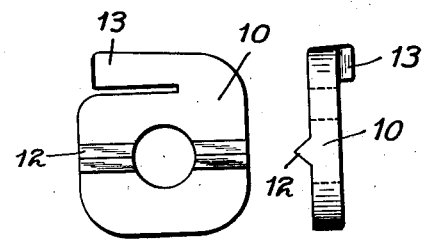 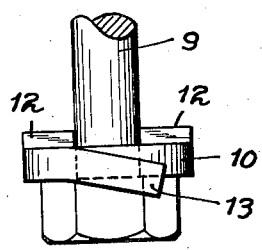
INVENTOR
George W. Campbell,
By Archworth Martin,
Attorney.

Patented Dec. 24, 1935

2,025,643

UNITED STATES PATENT OFFICE 2,025,643

NUT LOCK

George W. Campbell, Harrison City, Pa.

Application March 19, 1935, Serial No. 11,805

1 Claim. (Cl. 151—49)

My invention relates to nut locks and is hereinafter described and shown as employed more particularly in connection with the fastening of railway rail joints, but it will be understood that the invention can be employed in fastenings of other kinds.

One object of my invention is to provide in a single-piece nut lock, means for preventing the turning of the lock relative to a member against which it bears, and means for preventing a nut turning relative to the lock.

Another object of my invention is to provide a nut lock of washer-like form having a locking tongue for holding the nut, and ribs or teeth for engaging the article to be bolted in place, the tongue being formed by slitting along a line parallel to the ribs, whereby when the tongue is being bent outwardly alongside a nut, there is less danger of the lock washer being twisted or deformed, than if the slit were made in a direction transversely of the ribs.

My invention, in its application to a rail joint, is shown in the accompanying drawing wherein Figure 1 is a cross-sectional view of the joint; Fig. 2 is a side view of a portion of the joint; Fig. 3 shows a rear view of the lock nut; Fig. 4 shows an edge view thereof, and Fig. 5 is a plan view showing the lock washer in operative position upon a bolt.

The railroad track rails are indicated by the numeral 6 and are provided with the usual fish plates or splice bars 7 and 8, through which bolts 9 extend. Nut locks 10 of washer-like form are employed for preventing the nuts 11 turning. These washers are preferably formed of malleable metal and have on their rear sides V-shaped ribs 12 that engage the splice bars 7 to prevent the washer turning relative to said splice bars. The splice bar will be notched slightly by a scoring tool, or by a chisel to receive the ribs. The notches need not be formed so deeply as shown in the drawing, since very little biting or gripping action is required in order to prevent turning of the lock washer.

A tongue 13 is formed near one edge of the washer by slitting the washer along a line parallel to the ribs 12. The making of the slit parallel to the ribs 12 is of advantage, because the slit can be made of any desired length, without interfering with either of the ribs, and may be of sufficient length to form a long tongue which can be more readily bent outwardly than could a shorter tongue. The tongue is bent out by inserting a bar or other suitable tool between the outer end thereof and the adjacent surface of the splice bar.

When the tongue has been bent out slightly, it can be forced to a position approximately at right angles to the plane of the nut, if desired, by striking it with a hammer. The slitting of the washer along a line parallel to the ribs 12 has the further advantage of reducing tendency of the washer to twist when bending the tongue out, as compared to the twisting force which would be applied if the washer were formed by slitting the metal in a direction at right angles to the ribs 12. This is especially true where the grooves into which the ribs 12 seat are not of a depth equal to the thickness of the ribs, because the force required for bending out the tongue tends to tilt the washer about an axis at right angles to the ribs 12, and these ribs are of such length that they effectively resist the twisting action.

If the slit extended at right angles to the ribs, the washer might be so tilted or twisted during bending of the tongue, as to move the ribs out of shallow grooves. Further, there would be greater danger of distorting the washer.

I claim as my invention:—

A single-piece nut lock having a body portion of washer-like form and of stiff malleable metal, provided with a bolt hole and having V-shaped ribs on its rear surface, located at opposite sides of the hole and on a common diametral line, the lock being also slitted adjacent to one edge, along a line parallel to the said ribs, to form a tongue whose free end is bendable outwardly into fixed position, from the plane of the lock, to lie in edgewise engagement with the side of the nut.

GEORGE W. CAMPBELL.